United States Patent
Blanchfield et al.

(10) Patent No.: US 9,438,610 B2
(45) Date of Patent: Sep. 6, 2016

(54) ANTI-TAMPERING SERVER (71) Applicant: Pagefair Limited, Dublin (IE)

(72) Inventors: Sean Blanchfield, Dublin (IE); Brian McDonnell, Newbridge (IE); Neil O'Connor, Ashbourne (IE)

(73) Assignee: Pagefair Limited, Dublin (IE)

(*) Notice: Subject to any disclaimer, the term of this patent is extended or adjusted under 35 U.S.C. 154(b) by 0 days.

(21) Appl. No.: 14/475,322

(22) Filed: Sep. 2, 2014

(65) Prior Publication Data

US 2015/0082436 A1 Mar. 19, 2015

Related U.S. Application Data (60) Provisional application No. 61/872,869, filed on Sep. 3, 2013.

(51) Int. Cl.
*H04L 29/06* (2006.01)

(52) U.S. Cl.
CPC .................... *H04L 63/1408* (2013.01)

(58) Field of Classification Search
CPC ...... H04L 63/10; H04L 63/1408; H04L 9/32
USPC .......................................................... 726/23
See application file for complete search history.

(56) References Cited

U.S. PATENT DOCUMENTS

| | | | | |
|---|---|---|---|---|
| 5,678,041 A * | 10/1997 | Baker | | G06F 21/604 |
| 5,882,539 A * | 3/1999 | Hasegawa | | B24B 9/065 |
| | | | | 216/52 |
| 7,694,128 B2 * | 4/2010 | Judge | | H04L 12/585 |
| | | | | 380/282 |
| 2001/0037325 A1* | 11/2001 | Biderman | | G06F 17/30864 |
| 2002/0065842 A1* | 5/2002 | Takagi | | G06F 17/30905 |
| | | | | 709/217 |
| 2002/0111967 A1* | 8/2002 | Nagase | | G06F 17/30905 |
| | | | | 715/234 |
| 2002/0112185 A1* | 8/2002 | Hodges | | H04L 29/06 |
| | | | | 726/23 |
| 2002/0143862 A1* | 10/2002 | Peterson | | H04L 61/00 |
| | | | | 709/203 |
| 2002/0152093 A1* | 10/2002 | Chalmers | | G06Q 10/08 |
| | | | | 705/26.1 |
| 2003/0014503 A1* | 1/2003 | Legout | | G06F 21/10 |
| | | | | 709/219 |
| 2003/0093400 A1* | 5/2003 | Santosuosso | | G06F 17/30345 |
| 2003/0120752 A1* | 6/2003 | Corcoran | | G06F 17/30902 |
| | | | | 709/219 |
| 2003/0187656 A1* | 10/2003 | Goose | | G06F 17/2241 |
| | | | | 704/270.1 |
| 2007/0050711 A1* | 3/2007 | Walker | | G06F 17/30855 |
| | | | | 715/205 |
| 2010/0205297 A1* | 8/2010 | Sarathy | | H04L 12/2602 |
| | | | | 709/224 |
| 2011/0066710 A1* | 3/2011 | Paul | | G06F 17/3089 |
| | | | | 709/222 |
| 2011/0283359 A1* | 11/2011 | Prince | | H04L 67/146 |
| | | | | 726/23 |
| 2013/0298244 A1* | 11/2013 | Kumar | | G06F 21/52 |
| | | | | 726/25 |
| 2014/0359770 A1* | 12/2014 | Lin | | G06F 21/55 |
| | | | | 726/23 |

OTHER PUBLICATIONS

"Privoxy" Wikipedia: The Free Encyclopedia, Wikimedia Foundation, Inc., May 31, 2015. Web. Jun. 2, 2015. http://en.wikipedia.org/wiki/Privoxy.

"About Adblock Plus." About Adblock Plus. NP. Web. Jun. 2, 2015. https://adblockplus.org/en/about.

* cited by examiner

*Primary Examiner* — Hadi Armouche
*Assistant Examiner* — Shahriar Zarrineh
(74) *Attorney, Agent, or Firm* — Martensen IP (57) ABSTRACT

A method for preventing tampering with the accessibility of resources specified by Universal Resource Locators (URLs) comprising receiving a primary URL from a web server; creating a unique identifier and associating, in a database, the unique identifier with the received primary URL; creating a secondary URL that includes the unique identifier; and providing the secondary URL to the web server wherein the primary URL is cross referenced to the secondary URL through the unique identifier.

12 Claims, 4 Drawing Sheets

ANTI-TAMPERING SERVER

RELATED APPLICATION

The present application claims priority benefit to, U.S. Provisional Patent Application No. 61/872,869 filed Sep. 3, 2013, all of which are hereby incorporated by reference in their entirety for all purposes as if fully set forth herein.

BACKGROUND OF THE INVENTION

1. Field of the Invention

The present application relates in general to the addressing scheme by which resources on the internet are accessed, namely Uniform Resource Locators (URLs), and more particularly to methods to ensure the reliable delivery of internet content to client/users by preventing intermediaries from selectively tampering with the accessibility of content by filtering URLs.

2. Relevant Background

The most highly visited websites in the world make money through the display of advertising on behalf of other businesses. The global online display advertising market is expected to grow by 20% to nearly $40 billion US dollars in 2013. This advertising expenditure permits websites to provide their content free of charge to consumers.

In the early years of the World Wide Web it was common for computing experts to modify their computers settings to prevent them from communicating with internet servers that were known to host display advertising, thereby marginally decreasing the time it would take to download web pages. In recent years, a number of mainstream software tools have emerged that use similar techniques to prevent the display of advertising on all web pages.

Many of these tools are downloadable extensions for popular web browsers, which automatically block communication with thousands of internet servers. An exemplar is the "AdBlockPlus" extension, which is used by hundreds of millions of web users, and prevents the display of advertising on all websites they visit.

Other tools can be installed and configured at a network level, and can achieve the same effect. An exemplar is the "Privoxy" tool, which runs on a computer network and modifies any web traffic that is configured to pass through it.

Due to these blocking tools, many advertising-supported businesses are closing down due to declining revenues.

These tools, and others that employ similar techniques, inflict secondary damage on web businesses. Much functionality of modern websites depends on the web browser's ability to execute javascript source code. The blocking tools discussed above frequently attack javascript execution by preventing the associated source code files from being downloaded. They can also prevent javascript code from communicating with specified internet servers. This is typically used to stop websites collecting web analytics data about their visitors, upon which they depend in day-to-day decision making. This form of attack also damages the businesses that provide these web analytics services, and can be arbitrary directed at any of the growing number of other businesses that utilise similar software architectures.

By selectively blocking parts of web pages, these tools act to tamper with the intended user experience. This is detrimental to the businesses that publish this content, who wish to maintain the integrity of the functionality, presentation and branding of their website, as well as ensuring that any advertising is correctly displayed.

Many of these tools are downloadable extensions for popular web browsers, which automatically block communication with thousands of internet servers. An exemplar is the "AdBlockPlus" extension, which is used by hundreds of millions of web users, and prevents the display of advertising on all websites they visit.

Other tools can be installed and configured at a network level, and can achieve the same effect. An exemplar is the "Privoxy" tool, which runs on a computer network and modifies any web traffic that is configured to pass through it.

Due to these blocking tools, many advertising-supported businesses are closing down due to declining revenues.

These tools, and others that employ similar techniques, inflict secondary damage on web businesses. Much functionality of modern websites depends on the web browser's ability to execute javascript source code. The blocking tools discussed above frequently attack javascript execution by preventing the associated source code files from being downloaded. They can also prevent javascript code from communicating with specified internet servers. This is typically used to stop websites collecting web analytics data about their visitors, upon which they depend in day-to-day decision making. This form of attack also damages the businesses that provide these web analytics services, and can be arbitrary directed at any of the growing number of other businesses that utilise similar software architectures.

By selectively blocking parts of web pages, these tools act to tamper with the intended user experience. This is detrimental to the businesses that publish this content, who wish to maintain the integrity of the functionality, presentation and branding of their website, as well as ensuring that any advertising is correctly displayed.

It would therefore be advantageous to have a system whereby publishers of websites could protect their websites from such tampering. Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY

The present teachings disclose a system and method to prevent hackers or automated systems tampering with online documents, applications or appliances by selectively filtering access to online resources by inspecting their URLs.

Accordingly, a first embodiment of the application provides a method for preventing tampering with the accessibility of resources specified by Universal Resource Locators (URLs). The application also provides an anti-tampering filter. Advantageous embodiments are provided in the dependent claims.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. In order to fully appreciate the present teachings, it is necessary to first outline the conventional system and method by which content is delivered to clients.

Figure 1:
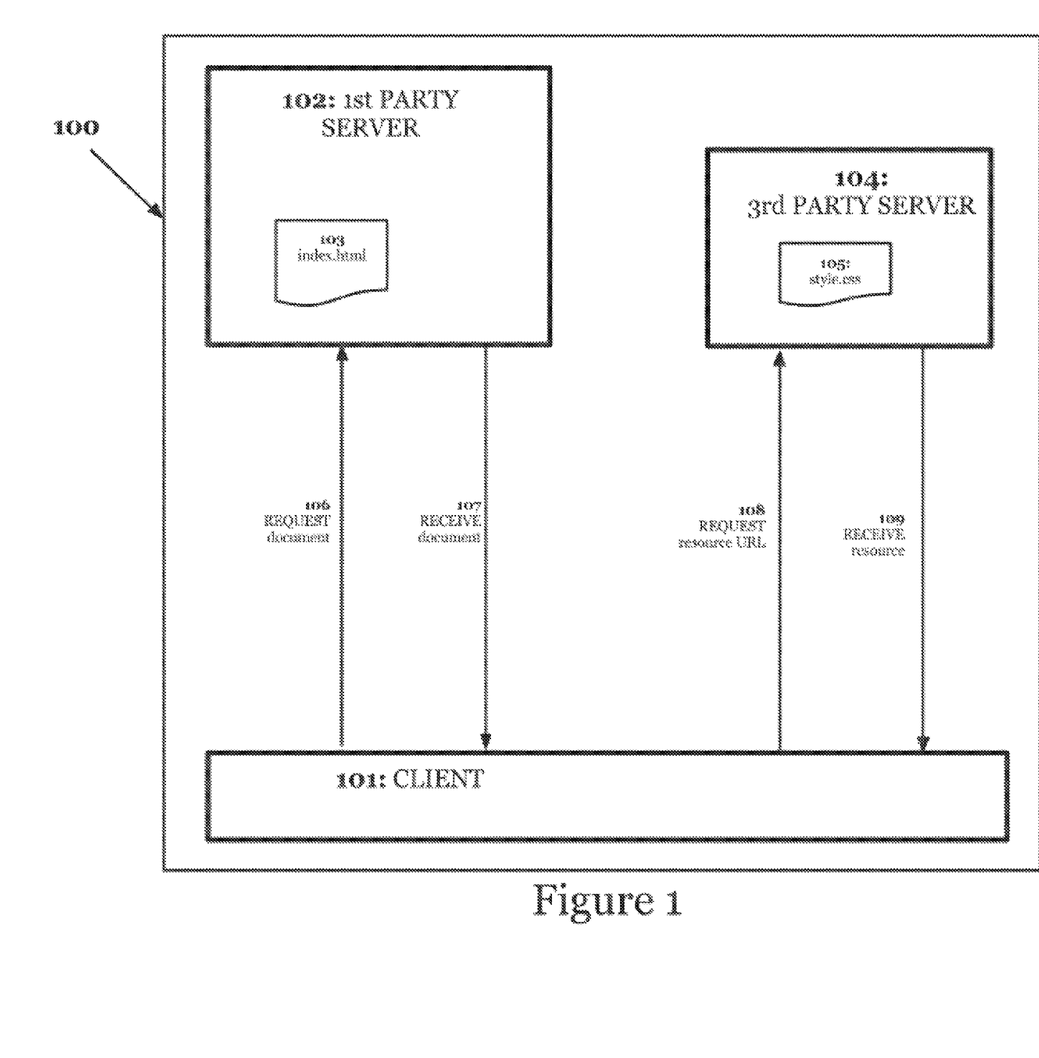
FIG. 1 is a diagram depicting the interaction between the components of the conventional system by which content is delivered to clients.

The conventional system and method is best described with reference to FIG. 1. This system 100 comprises of three components: a client 101, a first-party server 102, and a third-party server 104. It should be understood that "client" refers to any software or hardware that downloads data from the internet using URLs. Examples include but are not limited to: a web browser, a plugin running in a web browser, a video game, an application running on a mobile device, software running on a set-top TV box, or any other internet-enabled appliance. It should also be understood that although only a single $1^{st}$ party server 102 and single $3^{rd}$ party server 104 are shown in FIG. 1 for ease of understanding, in practice the system 100 may contains a plurality of $3^{rd}$ party servers 104 that the client 101 is capable of communicating with to obtain additional resources necessary for the correct functioning of the system. It should also be understood that in some embodiments, the $1^{st}$ party server 102 may also share the same role as the $3^{rd}$ party server 104.

The server 102 hosts a document 103 (called "index.html" in this example). It should be understood that the term "document" may refer to a HTML document, but may equivalently refer to any other kind of document containing a manifest of additional online resources. In some embodiments, clients may download pre-configured resources without first downloading a document. For example, a client may automatically download configuration files, databases and updates. These clients may be considered to have been pre-loaded with a document.

A separate $3^{rd}$ party server 104 hosts a resource 105 (called "style.css" in this example). As would be evident to a skilled person in the art, the term "resource" refers to an online resource that is available via a URL. Documents normally refer to a plurality of additional resources that clients should download. For example, HTML documents may include references to elements including CSS files, image files, video files, applets or javascript files. It should be understood that the term "vital resource" is used to denote those resources that must be downloaded in order for a document to function correctly on the client.

In the conventional system, the client 101 first downloads the document 103 from the server 102 as shown by messaging 106 and 107 of FIG. 1. When this download is complete, it downloads any additional resources specified by the document, such as the resource 105, which is hosted on a third-party server 104. Messaging 108 and 109 of FIG. 1 shows this downloading of additional resources.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Included in the description are flowcharts depicting examples of the methodology which may be used to ensure the reliable delivery of Internet content using the anti-tampering system of the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that executes on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

In a preferred embodiment, the present invention can be implemented in software. Software programming code that embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Figure 2:
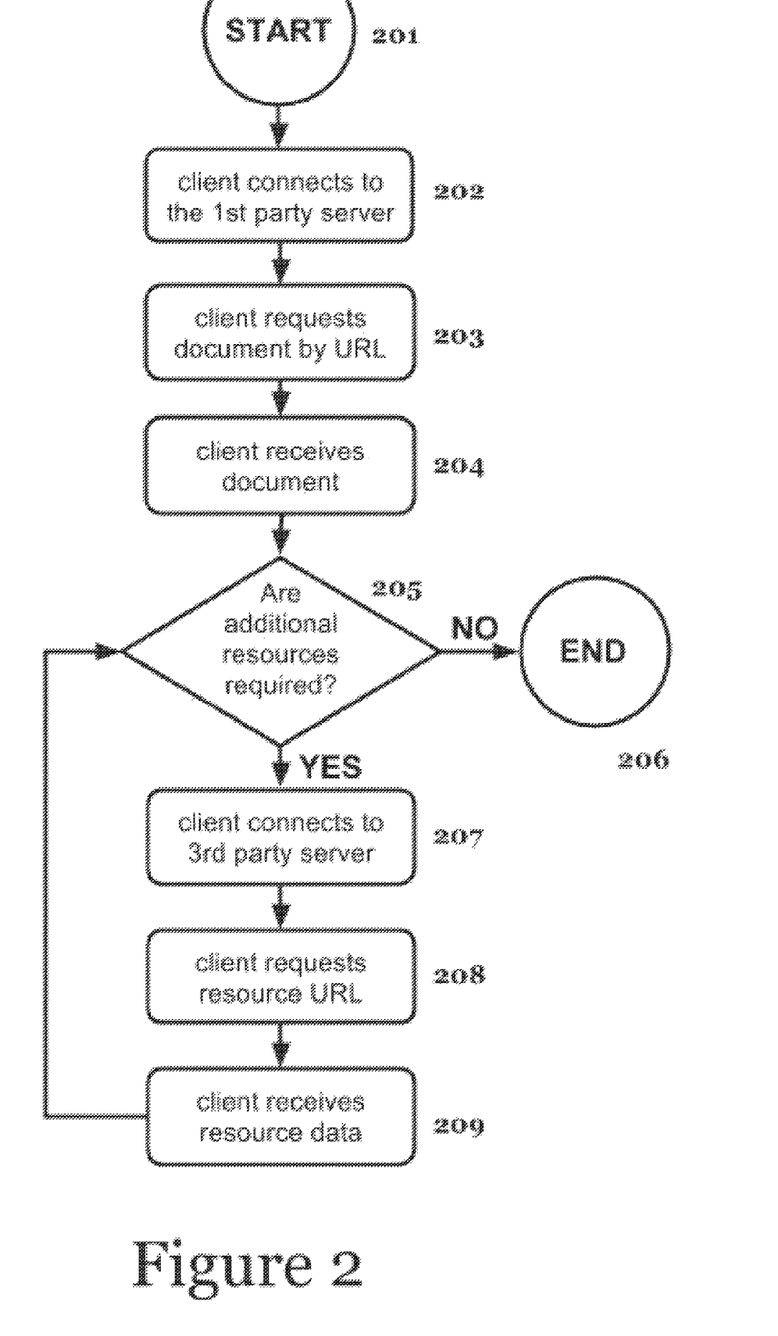
FIG. 2 is a flow chart depicting the steps performed in the conventional system by which content is delivered to clients.

The detailed sequence of steps performed in the conventional system 100 is best understood with reference to the flowchart provided in FIG. 2.

In step 202 the client (101) initiates a download by connecting to a $1^{st}$ party server (102) that hosts a desired document (103). After connecting to the $1^{st}$ party server, the client sends it a request (106), specifying the URL of the document (103) that it is seeking (step 203). In step 204, the $1^{st}$ party server returns (107) the requested document to the client. The client may now determine that the document does not specify any additional required resources (step 205), in which case the download process ends (step 206). After a client downloads a document, it may determine that it specifies additional associated resources (step 205). In this case, it proceeds to download each additional resource (105) by connecting to a $3^{rd}$ party server (104) specified in the resource URL (step 207), requesting (108) the URL (step 208), at which point it receives (109) the element data (step 209).

In an embodiment in which the client has been pre-loaded with a document, steps 202, 203 and 204 are unnecessary, as the client already possesses a document identifying any additional required resources. The process proceeds immediately to step 205 and proceeds normally.

Tools that tamper with the display of advertising on websites, as described in the Background to the Application above, act to disrupt clients 101 as they connect to $3^{rd}$ party servers 104 to download additional resources (207), such as advertising images. These tools are usually implemented as web browser extensions, which modify the behavior of the client 101, or as network filters, which disrupt messaging between the client 101 and the $3^{rd}$ party servers 104. These tools are designed to interfere with specific types of resources, such as advertising images. In instances where they inadvertently block vital resources they produce undesirable effects, for example, a web page may become unreadable.

The inventors have found that such tools depend on their ability to distinguish between the URLs of vital resources and the URLs of resources that they are designed to block. When these URLs are indistinguishable, such tools must either permit all resources to download, or block both vital and non-vital resources thereby impairing the functionality of the client. In particular, the inventors have developed a system and method that ensures a "vital resource" to be indistinguishable from a "protected resource". A "protected resource" should be understood to be a resource that is normally the subject of the tampering techniques or tools described previously, but is now defended or protected from those techniques.

This is achieved by providing anti-tampering features that make it impossible for hackers or automated tools to distinguish between the URLs of protected resources and vital resources. Therefore, the aforementioned tools are forced to permit all resources to download or otherwise be responsible for impairing the functionality of the client. These tools are marketed as improving user experience by preventing display of undesirable content such as advertising and therefore the developers of such tools would seek to avoid any impairment of the user experience.

Figure 3:
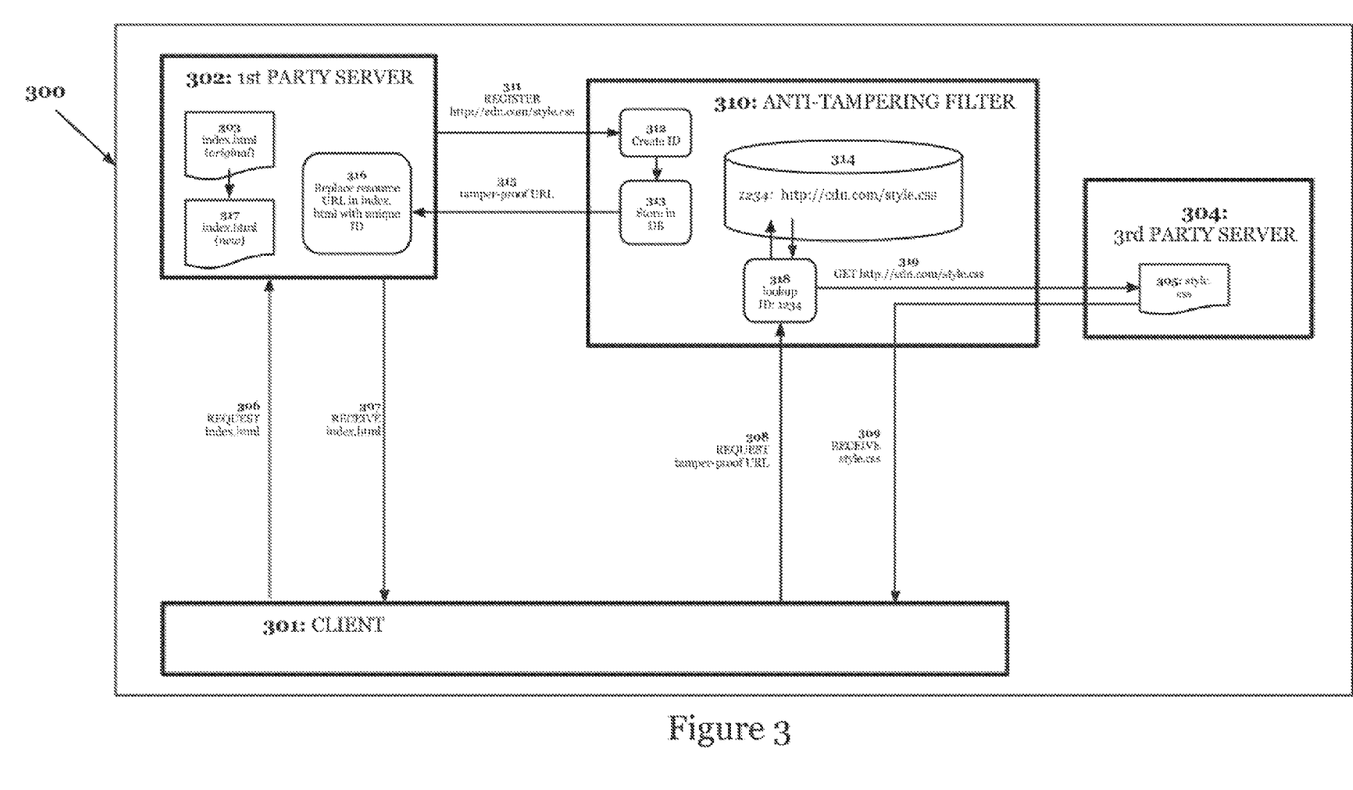
FIG. 3 is a diagram depicting the detailed interaction of the components in the present system and method set out in this application.

The teachings of the present application require the introduction of a new component to the conventional system 100 described in FIG. 1. As can be seen from FIG. 3, an anti-tampering filter 310 is introduced. In FIG. 3, the components and steps 301 to 309 correspond respectively to the components and steps 101 to 109 of FIG. 1. The anti-tampering filter 310 holds information about additional resources that are referred to in documents such as document 303 that clients may download from the server 302. Clients request additional resources via the anti-tampering filter, using URLs of a standard format. It is impossible for tampering tools to distinguish between multiple URLs that the anti-tampering filter may process. Therefore, resources that are received by the client from the anti-tampering filter cannot be identified by the blocking tools at the client 301 (or network within which the client is operating) as vital resources or resources that should normally be blocked.

When comparing FIG. 3 to FIG. 1, it should be noted that the client 301 no longer directly connects to the third-party server 304 to download the resource 305 (called "style.css" in this example). This connection is instead passed through the anti-tampering filter 310. It should also be noted that a connection is formed between the server 302 and the anti-tampering filter 310 to arrange what resources shall be protected. In the embodiment of FIG. 3, the publisher that operates the server 302 may gain access to the anti-tampering filter 310 by entering into a commercial arrangement with the business that operates the anti-tampering filter 310 as a service. In most cases, this will be possible without the involvement of the $3^{rd}$ party servers 304. Many publishers may simultaneously use one anti-tampering filter in this way.

An example of such a commercial agreement is illustrated as follows. A website "X" is primarily funded through the sale of advertising space on its webpages. An analysis has been performed by comparing the number of downloads of web pages to that of advertising images, demonstrating that a large percentage of the website's audience is using blocking tools. The website "X" enters into an agreement with an anti-tampering filter service provider. The website is then modified so that a vital resource, such as its main CSS stylesheet, is downloaded by clients through the filter. Finally, it is additionally modified so that advertising content is also downloaded through the filter. Many other websites may also be in a similar situation as website "X", and enter into similar commercial agreements, permitting them to also integrate their websites with the anti-tampering filter service.

The complete system developed by the inventors is best understood with reference to FIG. 3, which depicts the interactions of the components. These interactions are presently discussed in detail.

After the operator of the $1^{st}$ party server 302 enters into an agreement with the provider of the anti-tampering filter service, the $1^{st}$ party server 302 registers both protected and vital resources with the anti-tampering filter 310. In this example, it registers via message 311 a vital resource 305, which is hosted on separate third party server server 304. The anti-tampering filter 310 creates a new unique identifier (312) and stores it (313) in the database 314 along with the original URL of the resource. The anti-tampering filter 310 then returns a tamper-proof URL with response 315 to the $1^{st}$ party server 302, which contains the unique identifier for the resource.

In one embodiment, the database 314 stores the unique identifier and original URL indefinitely. In other embodiments, they are stored for a finite amount of time. In the latter case, the $1^{st}$ party server 302 must periodically renew the registration of each resource.

In the embodiment of FIG. 3 the response 315 contains the tamper-proof URL of the registered resource. In other embodiments, it may instead contain the unique identifier of the registered resource. In the latter case, the $1^{st}$ party server 302 would construct the tamper-proof URL itself, by combining the address of the anti-tampering filter 310 with the received unique identifier.

Upon receiving the response 315 from the anti-tampering filter, the web server 302 replaces (316) all instances of the original resource URL in the document 303 to produce a new version of the document shown as "index.html (new)" 317 in FIG. 3.

The registration steps 311 to 317 are performed for at least one vital resource, and are repeated for each additional vital or protected resource that is desired to be protected from tampering. Regardless of whether the resource in question is a vital resource or a protected resource, the registration steps 311 to 317 are the same. The client 301 now connects to the $1^{st}$ party server 302 to request the document 303 (request 306). Being unaware of the difference between the document 303 and the corresponding document 317, the client receives the new document 317 from the web server (response 307). This new document 317 contains tamper-proof URLs in place of the original URLs (contained in original document 303) of protected resources and vital resources.

The client 301 now proceeds to download the protected and vital resources specified in the new document 317. Each such resource (whether vital or protected) is identified in the document by means of a tamper-proof URL that is hosted on the anti-tampering filter 310. For each such vital and protected resource it connects to the the anti-tampering filter 310 to request 308 the resource associated with the resource's tamper-proof URL. Each tamper-proof URL contains a unique ID corresponding to a specific resource that was previously registered in step 311. The anti-tampering filter 310 uses this unique ID to lookup (step 318) the original URL in the database 314. The anti-tampering filter 310 then requests the resource specified by the original URL from the relevant server 304 (step 319). Note that it is possible that for some resources, the $3^{rd}$ party server 304 and the $1^{st}$ party server 302 may be the same.

The anti-tampering filter 310 returns the resource received from the $3^{rd}$ party server 304 to the client 301. In some embodiments, the anti-tampering filter may optimize this process by returning a cached version of the data, which has been recorded from a previous request for the same resource.

Steps 308, 318, 319 and 309 are repeated for each additional tamper-proof URL contained in the document received by the client.

Figure 4:
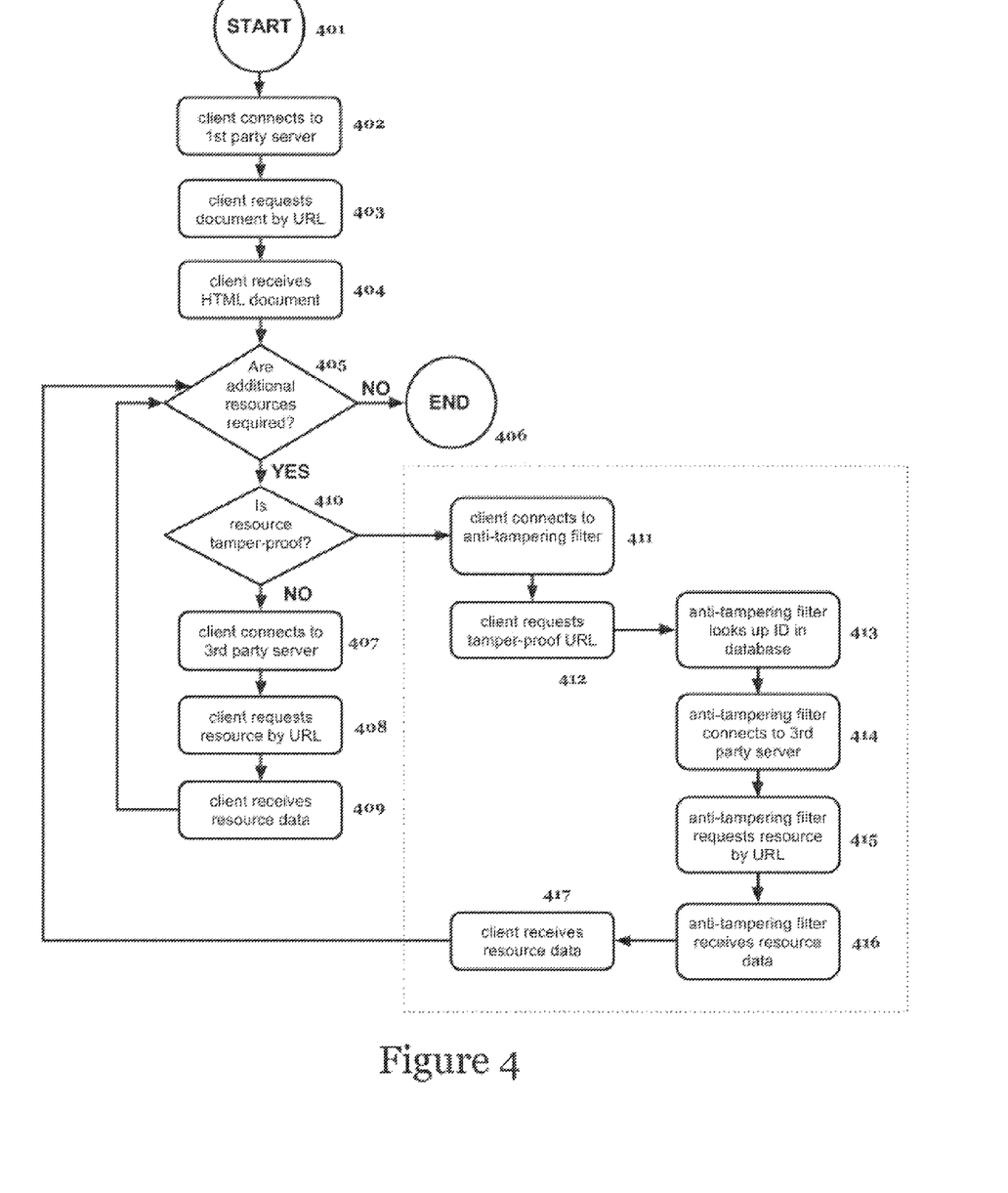
FIG. 4 is a flow chart depicting the augmented system, containing additional steps described in the present system and method set out in this application.

FIG. 4 illustrates the steps that are performed by the system of FIG. 3, in contrast to those presented for the conventional system in FIG. 2. When comparing FIG. 4 to FIG. 2 of the conventional system, steps 401 to 409 correspond to steps 101 to 109 respectively. The figures diverge with the addition of steps 410 to 417 in FIG. 4. In steps 410 to 417, the client optionally connects to the anti-tampering filter to request additional resources. Steps 410 to 417 approximately correspond to steps 308, 318, 319, and 309 in FIG. 3.

At step 410, the client 301 inspects the resource referenced by the received document 317. If the resource is tamper-proof, then the anti-tampering filter 310 will host its URL. In this case, the client proceeds to connect (411) to the anti-tampering filter to request (412) the resource by its tamper-proof URL. The anti-tampering filter uses the unique identifier contained in the tamper-proof URL to look up (413) the original resource in the database 314. The anti-tampering filter then connects (414) to the $3^{rd}$ party server 304, and requests (415) the resource 305 by its original URL. The 3$^{rd}$ party server returns (416) the resource 305 to the anti-tampering filter, which proceeds to send it to the client (417). The client then returns to step 405 to download the next resource.

As a consequence of the present system, the client will request one or more vital resources and the one or more protected resources via tamper-proof URLs instead of their original URLs. Because both the vital resources and the protected resources have similar tamper-proof URLs, it is impossible to reliably disrupt the downloading of one without inadvertently disrupting the other. Therefore, attempts to tamper with the downloading of protected resources will cause unintended damage to the functionality of the client.

In an embodiment, the invention provides a system to ensure that the downloading of advertising images cannot be tampered with by ad blocking tools without impairing the usability of the website to an unacceptable level. By virtue of this anti-tampering system, a website can now ensure that its content can only be enjoyed in conjunction with the intended advertising.

In another embodiment, the invention provides a method to ensure that javascript source code resources are downloaded. Javascript resources provide a useful and convenient way to extend the functionality of the web page with interactive features, to track data for the purposes of business intelligence or to download additional content into the web page, such as advertising images. By virtue of the present system, it becomes impossible for tampering tools to selectively block a javascript resource without also blocking resources vital to the functionality and performance of the website.

In another embodiment, the invention provides a method to ensure that communication between the client and a server is not blocked. For example, javascript code included on a web page may be required to report data to a third party analytics system. Such services are made accessible via web Application Programming Interfaces (APIs). Clients connect to a web API in the same way they connect to a web server to download a file, using a URL. Using the present system, a web server may register the URLs of web APIs in the same way that it registers the URL of a resource (step 302). As a consequence, it is impossible for a tampering tool to block access to the API without also disrupting the downloading of a vital page element, thereby impairing the usability of the web site to an undesirable extent.

The words comprises/comprising when used in this specification are to specify the presence of stated features, integers, steps or components but does not preclude the presence or addition of one or more other features, integers, steps, components or groups thereof.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A method for preventing tampering with the accessibility of resources specified by Universal Resource Locators (URLs) comprising:
receiving, at an anti-tampering filter, a primary URL from a web server, the primary URL being associated with a resource hosted on a separate third party server and being accessed via a first document retrieved from the web server by a client;
creating, at the anti-tampering filter, a unique identifier and associating, in a database, the unique identifier with the received primary URL;
creating, at the anti-tampering filter, a secondary URL that includes the unique identifier;
providing, by the anti-tampering filter, the secondary URL to the web server wherein the primary URL is cross referenced to the secondary URL through the unique identifier, wherein on receipt of the secondary URL, the web server creates a modified document by replacing all instances of the primary URL with the provided secondary URL, and wherein on receipt, by the web server, of a request for the first document from the client, providing the client with the modified document so as to initiate a request by the client to the anti-tampering filter via the secondary URL of the resource at the third party server and delivering that resource from the anti-tampering filter to the client wherein the request includes, checking the database to locate the primary URL associated with the unique identifier included in the secondary URL, requesting the resource from the third party server, using the primary URL, and providing the resource to a client.

2. The method of claim 1 wherein the primary URL and unique identifier are deleted from the database after a finite period of time.

3. The method of claim 1, wherein requesting the resource using the primary URL comprising requesting the resource from a third party server or retrieving the resource from memory.

4. The method of claim 1, wherein providing the resource comprising providing a cached version of the resource, which has been stored from a previous request for the same resource.

5. A method for preventing tampering with the accessibility of resources specified by Universal Resource Locators (URLs), the method comprising:
receiving a primary URL from a web server the primary URL being associated with a resource hosted on a separate third party server and being accessed via a first document retrieved from the web server by a client;
creating a unique identifier for the received primary URL and associating the unique identifier code in a database with the received primary URL;
providing the unique identifier to the web server;
using the web server to create a secondary URL, the secondary URL including the unique identifier such that the primary and secondary URLs are referenced to one another using the unique identifier wherein on receipt of the secondary URL, the web server creates a modified document by replacing all instances of the primary URL with the provided secondary URL, the method further comprising; and on receipt, by the web server, of a request for the first document from the client, providing the client with the modified document so as to initiate a request by the client to the anti-tampering filter via the secondary URL of the resource at the third party server and delivering that resource from the anti-tampering filter to the client wherein the request includes, checking the database to locate the primary URL associated with the unique identifier included in the secondary URL requesting the resource from the third party server, using the primary URL and providing the resource to a client.

6. The method of claim 5, wherein creating the secondary URL comprises the web server combining an internet protocol address of an anti-tampering filter with the unique identifier code.

7. An anti-tampering filter for preventing tampering with the accessibility of resources specified by Universal Resource Locators (URLs), the filter comprising a microprocessor and a database and configured to:

receive a primary URL from a web server, the primary URL being associated with a resource hosted on a separate third party server and being accessed via a first document retrieved from the web server by a client;

create a unique identifier and associate, in the database, the unique identifier with the received primary URL;

create a secondary URL that includes the unique identifier;

provide the secondary URL to the web server wherein the primary URL is cross referenced to the secondary URL through the unique identifier and wherein on receipt of the secondary URL, the web server creates a modified document by replacing all instances of the primary URL with the provided secondary URL; and on receipt, by the web server, of a request for the first document from the client, provide the client with the modified document so as to initiate a request by the client to the anti-tampering filter via the secondary URL of the resource at the third party server and delivering that resource from the anti-tampering filter to the client wherein the request includes, checking the database to locate the primary URL associated with the unique identifier included in the secondary URL, requesting the resource from the third party server, using the primary URL, and providing the resource to a client.

8. The filter of claim 7 configured to delete the primary URL and unique identifier from the database after a pre-defined period of time.

9. The filter of claim 7, wherein the request for a resource is received from the client through the internet.

10. The filter of claim 7, wherein the filter is configured as part of requesting the resource using the primary URL to request the resource from a third party server or retrieve the resource from memory.

11. The filter of claim 7, wherein the filter is configured as part of providing the resource to provide a cached version of the resource, which has been stored from a previous request for the same resource.

12. A computer network comprising a filter in communication with a web server, the web server configured to replace a primary URL with a secondary URL, the filter comprising a microprocessor and a database and configured to:

receive the primary URL from a web server, the primary URL being associated with a resource hosted on a separate third party server and being accessed via a first document retrieved from the web server by a client;

create a unique identifier and associate, in the database, the unique identifier with the received primary URL;

create the secondary URL that includes the unique identifier; provide the secondary URL to the web server wherein the primary URL is cross referenced to the secondary URL through the unique identifier and wherein on receipt of the secondary URL, the web server creates a modified document by replacing all instances of the primary URL with the provided secondary URL; and on receipt, by the web server, of a request for the first document from the client, provide the client with the modified document so as to initiate a request by the client to the anti-tampering filter via the secondary URL of the resource at the third party server and delivering that resource from the anti-tampering filter to the client wherein the request includes, checking the database to locate the primary URL associated with the unique identifier included in the secondary URL, requesting the resource from the third party server, using the primary URL, and providing the resource to a client.

* * * * *